(12) United States Patent
Kurihara

(10) Patent No.: US 9,177,170 B2
(45) Date of Patent: Nov. 3, 2015

(54) INFORMATION PROVISION SYSTEM, CONTENT INFORMATION COPYING DEVICE, USER TERMINAL DEVICE AND USER MANAGEMENT DEVICE

(75) Inventor: Shinichi Kurihara, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 602 days.

(21) Appl. No.: 11/515,932

(22) Filed: Sep. 6, 2006

(65) Prior Publication Data

US 2007/0061892 A1 Mar. 15, 2007

(30) Foreign Application Priority Data

Sep. 15, 2005 (JP) .................................. 2005-269050
Aug. 28, 2006 (JP) .................................. 2006-231122

(51) Int. Cl.
*G06F 21/62* (2013.01)
(52) U.S. Cl.
CPC .................................. *G06F 21/6227* (2013.01)
(58) Field of Classification Search
USPC .......... 713/155, 168, 171; 726/26, 27, 29, 30; 380/277, 278, 279
See application file for complete search history.

(56) References Cited

U.S. PATENT DOCUMENTS

| 5,991,399 | A * | 11/1999 | Graunke et al. | ............... 380/279 |
|---|---|---|---|---|
| 6,055,314 | A * | 4/2000 | Spies et al. | ..................... 380/228 |
| 6,438,235 | B2 * | 8/2002 | Sims, III | ........................ 380/285 |
| 6,470,085 | B1 * | 10/2002 | Uranaka et al. | ............... 380/231 |
| 6,550,009 | B1 * | 4/2003 | Uranaka et al. | ............... 713/168 |
| 6,550,011 | B1 * | 4/2003 | Sims, III | ........................ 713/193 |
| 6,574,609 | B1 * | 6/2003 | Downs et al. | .................. 705/50 |
| 6,834,348 | B1 * | 12/2004 | Tagawa et al. | ............... 713/193 |
| 6,859,535 | B1 * | 2/2005 | Tatebayashi et al. | ......... 380/201 |
| 7,343,491 | B2 * | 3/2008 | Nakano | .......................... 713/171 |
| 7,594,123 | B2 * | 9/2009 | Sako et al. | .................... 713/193 |
| 7,599,495 | B2 | 10/2009 | Kurihara | |

(Continued)

FOREIGN PATENT DOCUMENTS

CN 1322422 A 11/2001
EP 0 840 194 5/1998

(Continued)

OTHER PUBLICATIONS

Notification of First Office Action mailed Mar. 7, 2008, in corresponding Chinese Application No. 200610154001.7.

(Continued)

*Primary Examiner* — Jeffery Williams
(74) *Attorney, Agent, or Firm* — Finnegan, Henderson, Farabow, Garrett & Dunner, LLP

(57) ABSTRACT

A content encryption device generates encrypted content and an encrypted content copying device copies the encrypted content on an information storage medium. The storage medium is sold at a charge or distributed at no charge. A user gets the storage medium to connect the storage medium to a user terminal device or set the storage medium in a user terminal device, accesses to a content key distribution device to present a part or a whole of medium information of the storage medium to the distribution device. The distribution device grasps the whole of the medium information of the copied medium together with copied content and makes a content key encryption device issue an encrypted content key on the basis of user presentation information and distributes it to the terminal device.

6 Claims, 5 Drawing Sheets

(56) References Cited

U.S. PATENT DOCUMENTS

| | | | |
|---|---|---|---|
| 2002/0002466 A1* | 1/2002 | Kambayashi et al. | 705/1 |
| 2002/0026424 A1* | 2/2002 | Akashi | 705/57 |
| 2002/0077988 A1* | 6/2002 | Sasaki et al. | 705/59 |
| 2002/0150251 A1* | 10/2002 | Asano et al. | 380/277 |
| 2003/0126430 A1* | 7/2003 | Shimada et al. | 713/155 |
| 2004/0010509 A1* | 1/2004 | Higashiura et al. | 707/102 |
| 2005/0021774 A1 | 1/2005 | Kurihara et al. | |
| 2005/0171913 A1 | 8/2005 | Kurihara et al. | |
| 2005/0216763 A1* | 9/2005 | Lee et al. | 713/200 |
| 2006/0075397 A1* | 4/2006 | Kasahara | 717/170 |
| 2006/0200865 A1* | 9/2006 | Leake et al. | 726/27 |
| 2007/0053282 A1 | 3/2007 | Tong et al. | |
| 2008/0123592 A1 | 5/2008 | Popovic | |

FOREIGN PATENT DOCUMENTS

| | | |
|---|---|---|
| EP | 0 978 839 | 2/2000 |
| EP | 0 994 475 | 4/2000 |
| EP | 1 018 733 | 7/2000 |
| EP | 1128598 A1 | 8/2001 |
| JP | 7-295674 | 11/1995 |
| JP | 10-283270 | 10/1998 |
| JP | 2000-187935 | 7/2000 |
| JP | 2003-69548 | 3/2003 |
| JP | 2003-101525 | 4/2003 |
| JP | 2003-152700 | 5/2003 |
| JP | 2004-35150 | 2/2004 |
| JP | 2004-70893 | 3/2004 |
| JP | 2004-350150 | 12/2004 |
| JP | 2005-050176 | 2/2005 |
| JP | 2005-513913 | 5/2005 |
| JP | 2005-159752 | 6/2005 |

OTHER PUBLICATIONS

Kurihara, S. et al., "Information Provision System, Provision Information Copying Device, User Terminal Device and User Management Device," U.S. Appl. No. 11/453,092, filed Jun. 15, 2006.

Official Communication from the Japanese Patent Office, Notice of Reasons for Rejection in Japanese Patent Application 2006-231122 dated Jan. 28, 2010 (3 pages) and an English language translation (3 pages).

Shouko Honnike et al., Content Distribution Service using DVD, Matsushita Technical Journal, Oct. 18, 1998, vol. 44, No. 6, pp. 25-33 (15 Pages).

Final Notice of Rejection for Application No. 2006-231122, from the Japanese Patent Office, dated Jul. 19, 2011.

Kurihara et al. DVD over IP system, Content Delivery System Using DVD Recorders, Toshiba Review, Toshiba Corporation, vol. 60, No. 2, pp. 50-53, Jan. 20, 2005.

Extended European Search Report for Application No. 06018778.8, from the European Patent Office, dated Mar. 5, 2012.

* cited by examiner

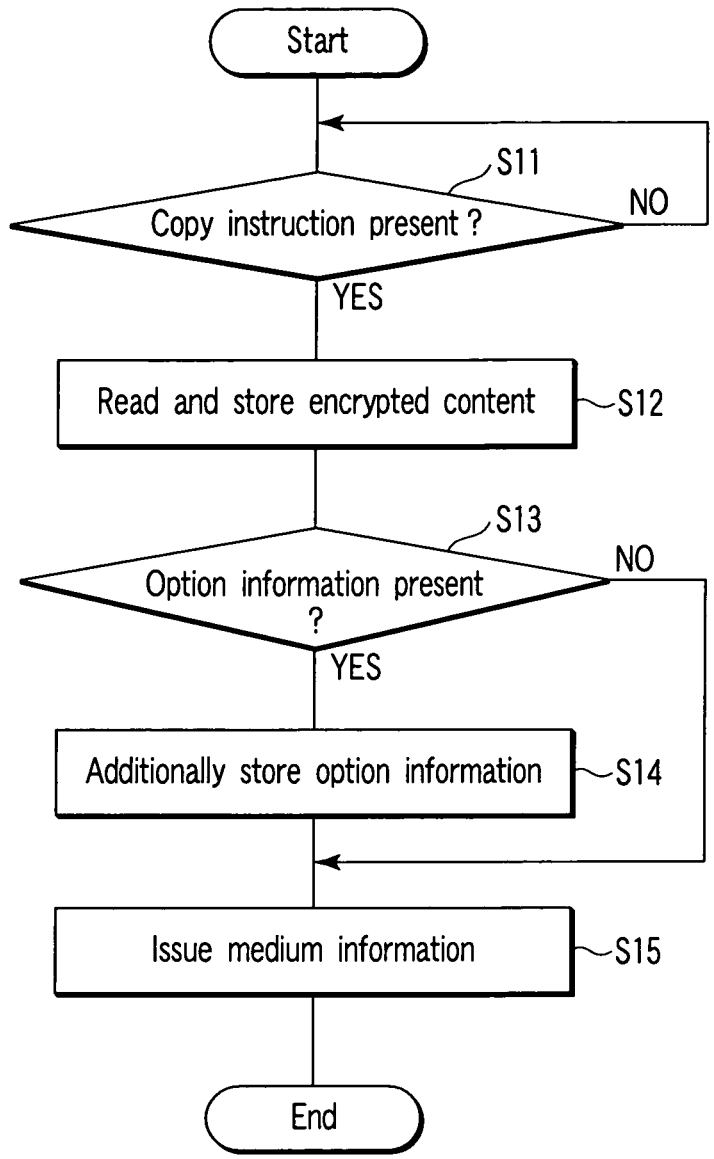
F I G. 2

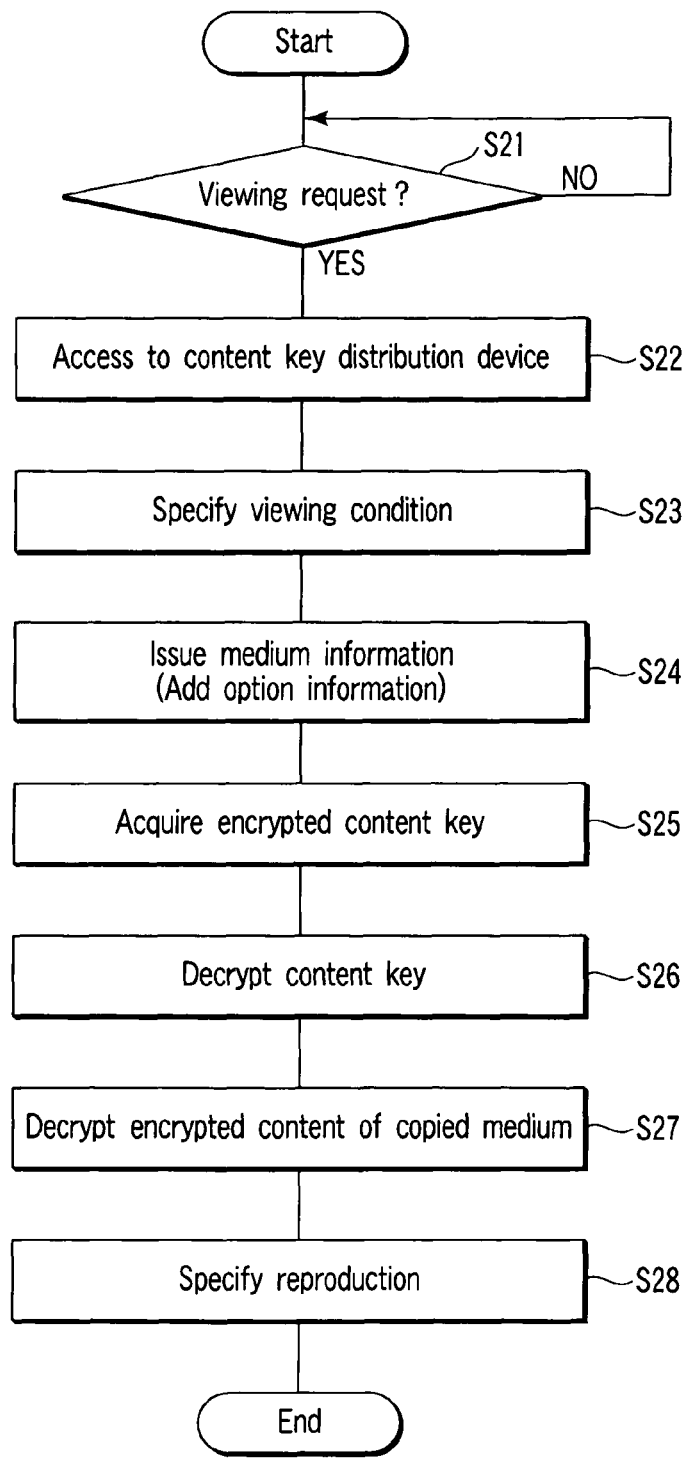
F I G. 3

INFORMATION PROVISION SYSTEM, CONTENT INFORMATION COPYING DEVICE, USER TERMINAL DEVICE AND USER MANAGEMENT DEVICE

CROSS-REFERENCE TO RELATED APPLICATIONS

This application is based upon and claims the benefit of priority from prior Japanese Patent Applications No. 2005-269050, filed Sep. 15, 2005, the entire contents of which are incorporated herein by reference.

BACKGROUND OF THE INVENTION

1. Field of the Invention

The present invention relates to an information provision system for providing content information to a terminal device on a user side, a content information copying device, a user terminal device and a user management device for use in the system.

2. Description of the Related Art

In recent years, it has become possible to distribute an enormous data quantity of content by using a communication line owing to the progress of a communication technology such as the Internet and a data compression technique depending on digital signal processing. Thereby, a customer has become possible to receive a content distribution service for music, movies, games, etc., regardless of time and place. An information provision system for achieving this content distribution service has generally a configuration in that a customer desiring purchasing/viewing (hereinafter referred to as user) accesses to a content distribution center through communication terminal equipment to download desired content from the distribution center or receives a stream distribution.

However, in the present situation, even when the user accesses to the distribution center, there are many cases, for popular and topical content, that only an introduction thereof or an advertisement therefor is provided and content for viewing is distributed thorough a mail order of a medium with the content recorded thereon. This is because a copyright owner of the content (or copyright manager, hereinafter both concepts are generally referred to as a copyright owner in some cases) still fears to suffer tremendous damage caused by a copyright infringement such as illegal copying with respect to a distribution to a user terminal device using the communication line. Like this, in the content distribution service, a distribution of important content has been in an extremely inactive situation, because a problem in an illegal distribution becomes a fetter, even if the content distribution service is desired by the user or attractive in business.

Thus, recently, a technique to prevent the illegal distribution of content has been presented, in which an information storage medium and a user terminal device implement copyright protection on the basis of license information given from each license agency. This technique has been publicly known commonly as content protection for recordable media (CPRM) and Advanced access content system (AACS).

An information provision system for the content distribution service in order to achieve perfect copyright protection is disclosed in Jpn. Pat. Appln. KOKAI Publication No. 2004-350150. This system utilizes the aforementioned CPRM technique to implement the copyright protection on the basis of the license information given from the license agency in the information storage medium, the user terminal device, a content encryption device and a content key encryption device. The content distribution center manages the content in an encrypted state and realizes a wide variety of types of copyright protection which enables controlling a content illegal outflow from the inside and outside of the distribution center and authentication processing among each enterprise and each device.

However, in a conventional information provision system described above, encrypted content with an enormous quantity of data has been transmitted via the communication line, traffic volume on the communication line increases as the number of users increases; the increase becomes a possible trigger of communication interference as well as it causes taking a long time to download the content. And the impossibility of an acquisition of content information without a user registration causes the difficulty of the user registration.

BRIEF SUMMARY OF THE INVENTION

An object of the present invention is to provide an information provision system capable of securing sufficient copyright protection even if the system distributes content information with a tremendous quantity of data in a distribution form without using a high-speed communication line and even if in a state before a user registration, its content information copying device, a user terminal device and a user management device.

An information provision system, regarding the present invention, allowing a user terminal device which enables reproducing content information from an information storage medium with the content information written therein together with at least medium information of a medium unique identifier and medium key information written therein, the system comprises: a content encryption device which acquires content key generation conditions together with the content information from a copyright owner or a copyright manager of the content information, generates a content key on the basis of the content key generation conditions and encrypts the content information by using the content key to generate encrypted content; a content information copying device which writes the encrypted content generated from the content encryption device into the information storage medium with the medium information written therein to create an information storage medium with the encrypted content copied thereon; a content key encryption device which registers the whole or a part of the medium information of the information storage medium as well as stores the content key generated from the content encryption device, uses the medium information or the medium information and device unique information of the user terminal device presented from the user terminal device when content is required, and then encrypts a content key corresponding to the required content to generate an encrypted content key; and an encrypted content key distribution device which acquires to store each medium information of the copied information storage medium from the content information copying device, receives a content viewing request for the copied information storage medium from the user terminal device, acquires medium information of the copied information storage medium at the time of the reception to compare it with the stored medium information, sends matched medium information to the content key encryption device and distributes the encrypted content key from the key encryption device to the user terminal device of a request origin via a communication line, wherein the user terminal device accesses to the content key distribution device via the communication line at viewing the copied information storage medium, presents the medium information stored in the copied information storage medium or the medium information and the device unique information, and then acquires the encrypted content key to decrypt the encrypted content stored in the copied information storage medium from the encrypted content key distribution device to decrypt the content key.

A content information copying device, regarding the present information, which is used for an information provision system allowing a user terminal device which enables reproducing content information from an information storage medium with the content information written therein together with at least medium information of a medium unique identifier and medium key information written therein, the system is composed of: a content encryption device which acquires content key generation conditions together with the content information from a copyright owner or a copyright manager of the content information, generates a content key on the basis of the content key generation conditions and encrypts the content information by using the content key to generate encrypted content; a content information copying device which writes the encrypted content generated from the content encryption device into the information storage medium with the medium information written therein to create an information storage medium with the encrypted content copied thereon; a content key encryption device which registers the whole or a part of the medium information of the information storage medium as well as stores the content key generated from the content encryption device, uses the medium information or the medium information and device unique information of the user terminal device presented from the user terminal device when content is required, and then encrypts a content key corresponding to the required content to generate an encrypted content key; and an encrypted content key distribution device which acquires to store each medium information of the copied information storage medium from the content information copying device, receives a content viewing request for the copied information storage medium from the user terminal device, acquires medium information of the copied information storage medium at the time of the reception to compare it with the stored medium information, sends matched medium information to the content key encryption device and distributes the encrypted content key from the key encryption device to the user terminal device of a request origin via a communication line, the copying device comprises: an encrypted content storage unit which stores the encrypted content generated from the content encryption device; a copy processing unit which reads out encrypted content from the encrypted content storage unit and writes it into the information storage medium with the medium information written therein to create a copy of the encrypted content; and medium information issuing unit which transmits medium information of the copied information storage medium with the encrypted content copied thereon to the content key distribution device to store it therein.

A user terminal device, regarding the present invention, which is used for an information provision system and enables reproducing content information from information storage medium with the content information written therein together with at least medium information of a medium unique identifier and medium key information, the provision system is composed of: a content encryption device which acquires content key generation conditions together with the content information from a copyright owner or a copyright manager of the content information, generates a content key on the basis of the content key generation conditions and encrypts the content information by using the content key to generate encrypted content; a content information copying device which writes the encrypted content generated from the content encryption device into the information storage medium with the medium information written therein to create an information storage medium with the encrypted content copied thereon; a content key encryption device which registers the whole or a part of the medium information of the information storage medium as well as stores the content key generated from the content encryption device, uses the medium information or the medium information and device unique information of the user terminal device presented from the user terminal device when a content is required, and then encrypts a content key corresponding to the required content to generate an encrypted content key; and an encrypted content key distribution device which acquires to store each medium information of the copied information storage medium from the content information copying device, receives a content viewing request for the copied information storage medium from the user terminal device, acquires medium information of the copied information storage medium at the time of the reception to compare it with the stored medium information, sends matched medium information to the content key encryption device and distributes the encrypted content key from the key encryption device to the user terminal device of a request origin via a communication line, the terminal device comprises: access means for accessing the content key distribution device via the communication line in viewing the copied information storage medium; content key acquiring means for acquiring the encrypted content key distributed from the encrypted content key distribution device by presenting the medium information stored in the copied information storage medium, or presenting the medium information and the device unique information; content key decryption means for decrypting the encrypted content key on the basis of the medium information stored in the copied information storage medium, or of the medium information and the device unique information; and content reproduction means for reproducing the encrypted content recorded on the copied information storage medium by using the decrypted content key.

A user management device of an information provision system, regarding the present invention, which is used for the information provision system allowing a user terminal device which enables reproducing content information from an information storage medium with the content information written therein together with at least medium information of a medium unique identifier and medium key information written therein, the system is composed of: a content encryption device which acquires content key generation conditions together with the content information from a copyright owner or a copyright manager of the content information, generates a content key on the basis of the content key generation conditions and encrypts the content information by using the content key to generate an encrypted content; a content information copying device which writes the encrypted content generated from the content encryption device into the information storage medium with the medium information written therein to create an information storage medium with the encrypted content copied thereon; a content key encryption device which registers the whole or a part of the medium information of the information storage medium as well as stores the content key generated from the content encryption device, uses the medium information or the medium information and device unique information of the user terminal device presented from the user terminal device when a content is required, and then encrypts a content key corresponding to the required content to generate an encrypted content key; and an encrypted content key distribution device which acquires to store each medium information of the copied information storage medium from the content information copying device, receives a content viewing request for the copied information storage medium from the user terminal device, acquires medium information of the copied information storage medium at the time of the reception to compare it with the stored medium information, sends matched medium information to the content key encryption device and distributes the encrypted content key from the key encryption device to the user terminal device of a request origin via a communication line, the management device comprises: user information storage means for storing user information of an encrypted content key distribution destination of the encrypted content key distribution device; and charging processing means for performing charging processing to a user terminal device of the distribution destination by referring to the storage means at distributing the encrypted content key.

According to the present invention, because the encrypted content having an enormous amount of data is copied on the information storage medium and appropriately distributed, an information provision system which enables distributing content information having an enormous amount of data without using a high-speed communication line and reducing a load on a communication line, or enables being used by a user before a user registration, its content information copying device, a user terminal device and a user management device can be provided.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is an exemplary flowchart for specifically explaining a flow of processing of an encrypted content copying device in FIGS. 1A, 1B and 1C; and FIG. 3 is an exemplary flowchart for explaining specifically a flow of processing of a user terminal device in FIGS. 1A, 1B and 1C.

DETAILED DESCRIPTION OF THE INVENTION

Hereinafter, embodiments of the present invention will be explained in detail with reference to the drawings.

Figure 1A:
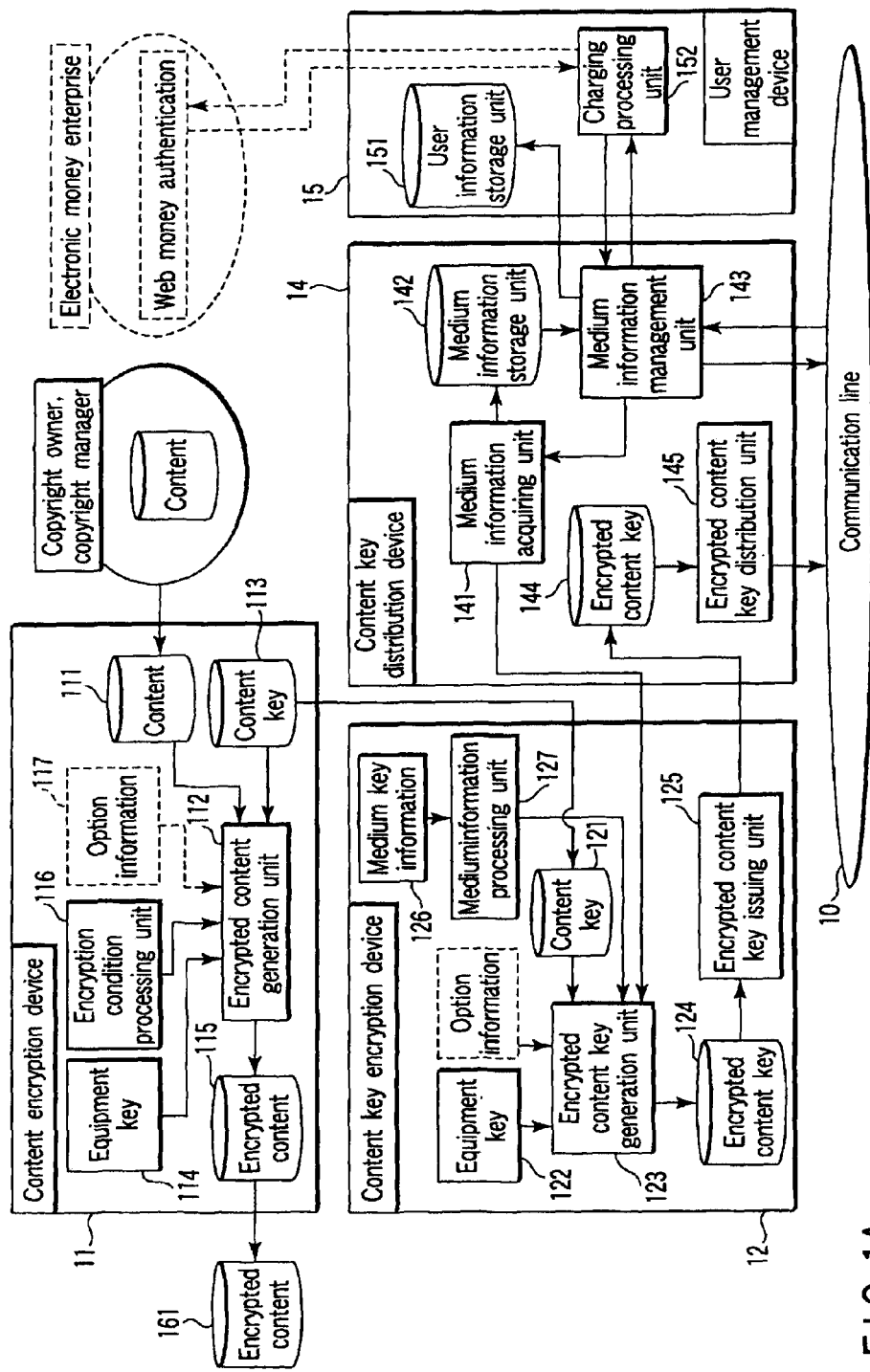
FIGS. 1A, 1B and 1C are exemplary block diagrams showing a configuration of an embodiment of an information provision system regarding the present invention.
Figure 1B:
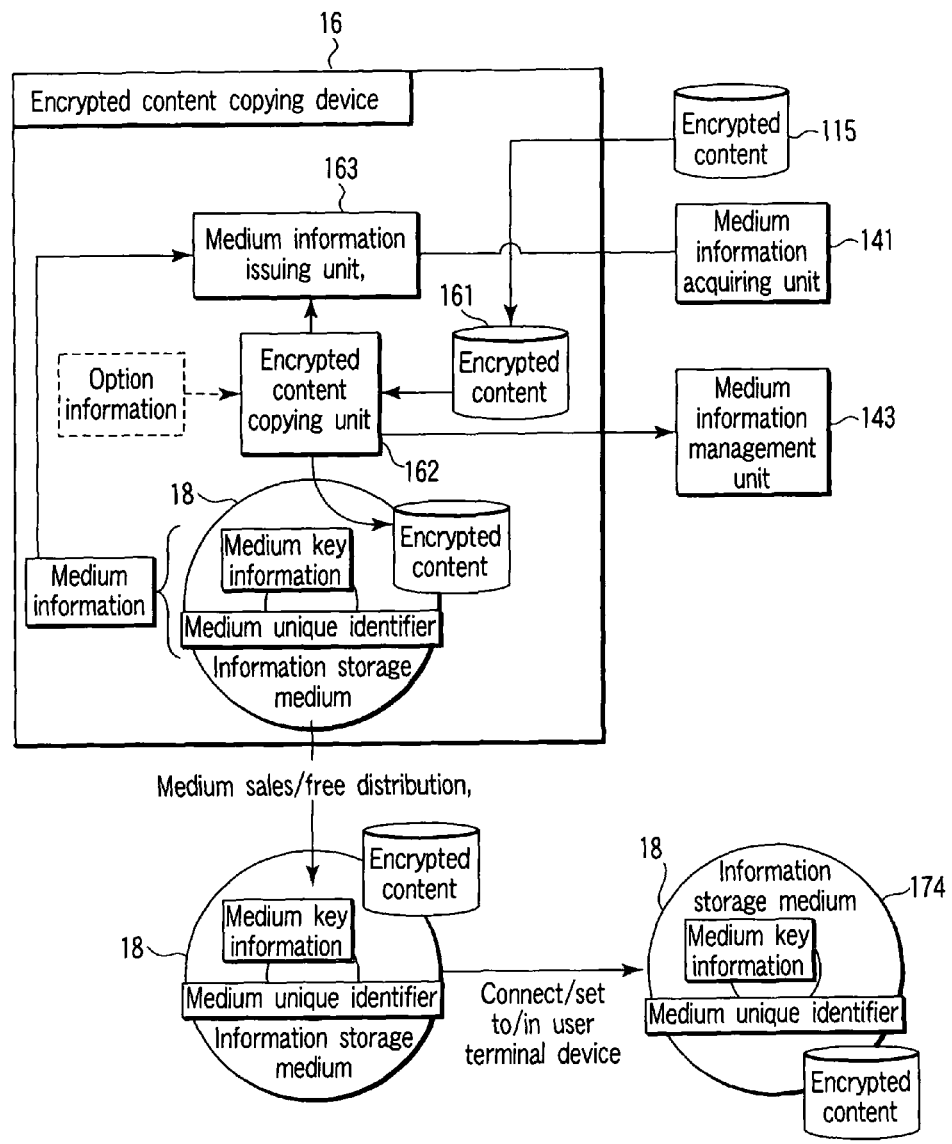
Figure 1C:
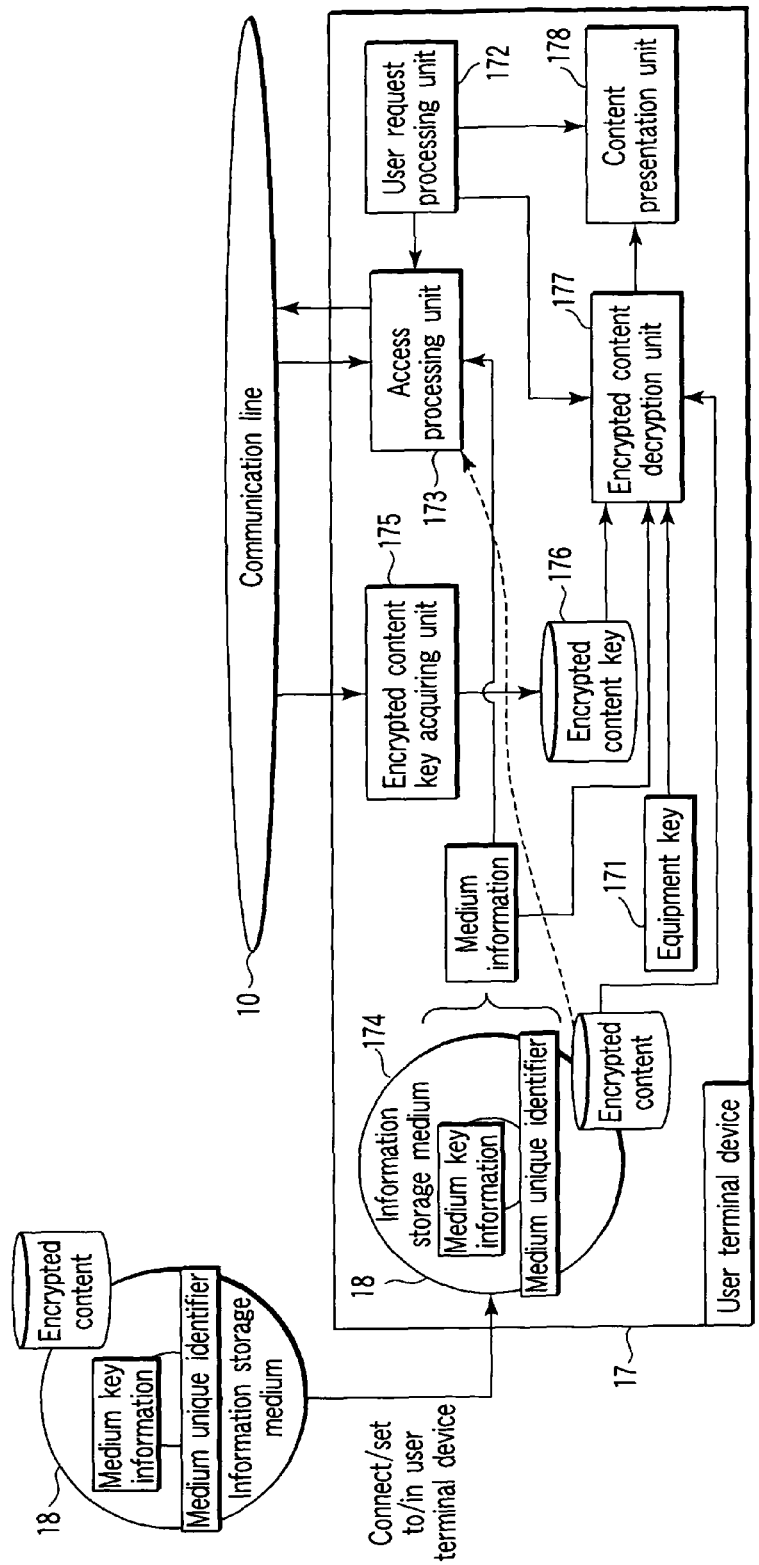

FIGS. 1A, 1B and 1C are functional block diagrams showing an embodiment of a system which achieves a content distribution service having a copyright protection function as an information provision system regarding the present invention.

In the system shown in FIGS. 1A, 1B and 1C, a device on an information provider includes an encrypted content copying device 16 in addition to a content encryption device 11, a content key encryption device 12, a content key distribution device 14 and a user management device 15. On the other hand, a user terminal device 17 provided as a device on a user side has a function to communicate with the content key distribution device 14 via a communication line 10 and a function to read out and reproduce the content information written in a below-mentioned copied information storage medium 18.

At this point, in the user terminal device 17, for instance, a built-in ROM 171 stores an equipment key licensed from a license agency (not shown) for copyright protection in manufacturing by an equipment manufacturer. The copied information storage medium 18 is, for instance, a CPRM-compliant disk which is read only information (such as DVD-R) or writable and readable information (such as DVD-RW, DVD-RAM and SD memory), and a unique identifier (hereinafter referred to as medium unique identifier) assigned uniquely at every medium is added to the disk in being manufactured by the medium manufacturer. And also the medium key information licensed from the license agency in advance is added to the disk to record it in control information storage areas thereof, respectively.

The foregoing system configuration provides the encrypted content through a recording medium without using the communication line 10 and legally copy the encrypted content onto the storage medium 18 by the copying device 16, sells at a charge or distributes at no charge, and distributes an encrypted content key which can be decrypted only by using the corresponding storage medium 18 to the terminal device 17 via the communication line 10.

Hereinafter, configurations of each device will be described specifically.

In FIGS. 1A, 1B and 1C, the content encryption device 11 receives content from a copyright owner or a copyright manager by means of a content receiving unit 111 to send it to an encrypted content generation unit 112. On the other hand, a content key generation unit 113 generates a content key in accordance with random numbers, etc. An equipment key storage unit 114 stores an equipment key which is licensed from the license agency (not shown) in advance and is set to reproduction equipment of the terminal device 17. The content generation unit 112 encrypts the content received on the basis of the content key and the equipment key to generate the encrypted content and stores it in an encrypted content storage unit 115.

If there are constrained conditions from the copyright owner or copyright manager, or those from the license agency, the medium manufacturer, an equipment manufacturer, and the like, an encryption condition processing unit 116 presents condition information to the encrypted content generation unit 112 if necessary. If there is any option in relation to provision content, an option information processing unit 117 presents the option information to the content generation unit 112. When the condition information and option information are presented, the content generation unit 112 adds the information in encrypting the content.

As for the option information, it includes information to identify the copyright owner or copyright manager, information to identify the content key distribution device 14, information to identify a region, information to identify the medium manufacturer, information to identify the equipment manufacture, content identification information, information to indicate content viewing conditions, and control attached information of the content, etc. As for the control attached information, it includes, for instance, menu information, transition information in the content (thumbnail, menu link, etc.), external linkage information (connection address for the Internet, etc.), guidance information (character, still image, etc.).

The generated and encrypted content is issued to the encrypted content copying device 16, and the content key used in encrypting the content is issued to the content key encryption device 12.

The key encryption device 12 once stores the content key received from the content encryption device 11 in a content key storage unit 121. On the other hand, the key encryption device 12 acquires the equipment key information in advance from the license agency to store it in an equipment key storage unit 122 and acquires the content identification information including the medium information (medium key information and medium unique identifier) from the user terminal device 17 which has been requiring viewing through the below-mentioned content key distribution device 14 and the communication line 10. A key generation unit 123 then takes in the content key corresponding to the content specified by the content identification information from the key storage unit 121 to encrypt the content key on the basis of a part or the whole of the medium information and the equipment key (including option information if it is present), stores the generated and encrypted content key in a storage unit 124 to add authentication information by means of an encrypted content key issue unit 125, and then transfers it to the content key distribution unit 14.

In particular, the key encryption device 12 acquires the medium key information of the copied medium 18 from the license agency in advance in order to enable legal decryption of the encrypted content through a copied medium distribution and stores it in a medium key information storage unit 126. And when viewing for the encrypted content recorded on the copied medium 18 is required, a medium information processing unit 127 reads out the corresponding medium information from the key information storage unit 126 to transfer it to the key generation unit 123. And the key encryption unit 12 issues the encrypted content key which is possible to be decrypted only in reproducing the encrypted content recorded in the copied medium 18 which has been viewing-required.

The medium information processing unit 127 checks if the stored medium key information licensed from the license agency is the medium key information acquired from the content encryption device 11. And if they are not matched with each other, the information processing unit 127 conducts handling to store them as if they have been licensed from the license agency or to stop encryption of the content key as if they have not been licensed.

In the content key distribution device 14, a medium information acquiring unit 141 receives medium information issued from the copying device 16 for each medium copy together with copied information identification information to store it in a medium information storage unit 142. A medium information management unit 143 receives access from the terminal device 17, and when a viewing request is made, receives medium information of information storage medium transmitted from the terminal device 17 via the communication line 10. The information management unit 143 then compares it with the stored information in the information storage unit 142 and notifies it to the key encryption device 12 together with the corresponding content identification information to require issue of an encrypted content key. Further, the information management unit 143 receives the encrypted content key issued from the key encryption device 12 to store it in an encrypted content key storage unit 144. An encrypted content key distribution unit 145 distributes the encrypted content key to the terminal device 17 on a viewing request origin via the communication line 10 on the basis of an instruction content of the connect key distribution.

The user management device 15 stores user information including personal information, viewing condition information or the like of a registered user in advance, and when access is made to the key distribution device 14 from the terminal device 17 via the communication line 10, charges to the viewing requiring user by means of a charging processing unit 152 and performs authentication confirmation to and from an electronic money (Web money) enterprise as the need arises.

Here, the user information storage unit 151 manages user information to achieve charging processing for a service subscriber. If the charging is needed, the charging processing unit 152 sends information to an authentication system for the Web money, etc., owned by the enterprise and acquires information indicating propriety of the charging to notify the propriety to the key distribution device 14.

The management device 15 is not always needed, and the charging processing can be performed by making a user pay a viewing charge in advance by, for instance, electronic money and present it at the time of access and by subtracting the value equivalent to an amount of viewing from the presented electronic money.

The encrypted content copying device 16 stores encrypted content of a specified title sent from the content encryption device 11 in a storage unit 161. An encrypted content copying unit 162 reads out the encrypted content from the storage unit 161 to write it in an information storage medium (aforementioned CPRM-compliant medium) having the medium key information licensed to the medium manufacturer from the license agency and the medium unique identifier uniquely assigned by the medium manufacturer, and then creates a medium, with the encrypted content copied thereon, titled with the specified title. The copied medium 18 created like this is sold at charge or distributed at no charge.

The foregoing copy processing adds the option information into the information storage medium if necessary. The option information includes information to identify the medium manufacture, information to identify the key distribution device, information to identify the equipment manufacturer, content identification information, information indicating content viewing conditions, control attached information of content.

In copying the encrypted content onto the information storage medium, a medium information issuing unit 163 acquires the medium information of the information storage medium that is a target of a copy to issue it to the content key distribution device 14. At this moment, it is preferable to issue the medium information together with a part or a whole of information set as the option information, necessity or non-necessity of charging, price information in the case of necessity of charging, conditions in the case of limitation of viewing depending on a period, and the like.

In the foregoing system configuration, processing operations of each principle unit will be explained below.

At first, the encrypted content copying device 16, as shown in FIG. 2, receives a copying instruction (ST11), reads out the corresponding encrypted content to store it in the information storage medium 18 (ST12) and determines the presence or absence of the option information (ST13). And in the case of presence of the option information, the copying device 16 additionally stores the option information in the storage medium 18 together with the encrypted content (ST14). Further, the copying device 16 acquires the medium information of the storage medium 18 with the encrypted content and option information stored therein and adds the stored content identification information thereto to issue the medium information to the content key distribution device 14 (ST15).

The user terminal device 17, as shown in FIG. 3, sets the copied medium 18 to a medium drive 174 and determines whether or not a viewing request for the copied medium 18 is received (ST21). In the case of presence of the viewing request (YES, in ST21), the terminal device 17 reads out, for instance, an access destination from the option information of the copied medium 18 to access to the key distribution device 14 (ST22) using access processing unit 173, and specifies viewing conditions, etc., in accordance with guidance instructed from the key distribution device 14 (ST23). At this moment, if a part or the whole of the medium information of the storage medium 18 set in the medium drive 174 is present and the option information is present in the storage medium 18 or in the stored encrypted content, the terminal device 17 acquires the information as the occasion demands to issue it to the key distribution device 14 (ST24). With this issuing, the terminal device 17 receives the encrypted content key distributed from the key distribution device 14 by means of an encrypted content key acquiring unit 175 to store it in a storage unit 176 (ST25).

In response to the viewing request for the encrypted content stored in the copied information storage medium, an encrypted content decryption unit 177 firstly reads out an encrypted content key to decrypt the encrypted content from the storage unit 176, and decrypts the encrypted content key using the medium information and the equipment key (ST26). The content decryption unit 177 then decrypts the encrypted content read out from the copied medium 18 through the medium drive 174 by using the content key (ST27). A content presentation unit 178 presents the content decrypted like this under a certain condition (ST28). That is, the encrypted content decryption unit 177 and the content presentation unit 178 receive presentation control under a user operation the viewing-required ought a user request processing unit 172. Thereby, the terminal device 17 can view the encrypted content on the set copied medium 18.

In the embodiment given above, in requiring the issue of the encrypted content key to the content key encryption device 12, the user needs content identification information to specify the content. Therefore, identification information may be acquired in a manner such that the content encryption device 11 adds the identification information in the encrypted content, the copying device 16 adds it in the information storage medium 18 and the medium drive 174 of the terminal device 17 acquires it, and may be issued from the content key distribution device 14 together with the medium information. That is to say, the content identification information may be stored in the user information storage unit 151 in associated with the medium information by the information, from the copyright owner and copyright manager, from encrypted content the content encryption device 11, from the copying device 16 and from the content key distribution device 14, etc. And then, the identification information may be taken out by the medium information management unit 143 to issue it to the medium information acquiring unit 141 when the information management unit 143 receives the viewing request from the user terminal device 17.

As descried above, in this embodiment, the content encryption device 11 generates the encrypted content, and the encrypted content copying device 16 copies only the encrypted content to one or more information storage media 18. At this moment, the copying device 16 adds the option information to the content as the occasion demands. The copied information storage medium 18 should be sold at a charge or distributed at no charge.

The user gets the storage medium 18 to connect or set it to or in the user terminal device 17, accesses to the content key distribution device 14 and presents a part or the whole of the medium information to the content key distribution device 14.

The key distribution device 14 makes a request for issuing the encrypted content key to the content key encryption device 12, and the key encryption device 12 extracts the corresponding content key to encrypt it in accordance with a part or the whole of the equipment key information, with the medium information and also with the option information as the need arises, and issues the encrypted content key to the content key distribution device 14. The key distribution device 14 then distributes the encrypted content key to the user terminal device 17.

Therefore, the user can get the encrypted content having an enormous quantity of data without using any communication line. Thereby, the user can reduce the load on the communication line and the user can use even a communication line with a low communication speed.

Accordingly, it becomes possible even for a user to use content in a manner in which the copyright is protected without having to perform the user registration, to perform spot use in accordance with charging in use of the electronic money such as Web money or to be induced to become a service subscriber by participating promotional use without any charge. And in the above-mentioned embodiment, a system having been presented on the premise that uses CPRM-compliant medium, the present invention can be achieved similarly even in a system which uses AACS-compliant medium.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information provision system comprising:
a content encryption circuit which acquires content key generation conditions and content information from a copyright owner or a copyright manager of content, generates a content key on the basis of the content key generation conditions, and encrypts the content information using the content key to generate encrypted content;
a content information copying circuit which attaches content identification information identifying the content information and access destination information to the encrypted content, writes the encrypted content to an information storage medium with the content identification information and the access destination information attached to the encrypted content to generate a copied information storage medium, the information storage medium comprising medium information including medium key information and a unique identifier of the information storage medium, acquires the medium information from the information storage medium, attaches the content identification information to the acquired medium information, and issues the medium information and the content identification information attached to the medium information;
a content key encryption circuit which stores the content key generated by the content encryption circuit; and
an encrypted content key distribution circuit which acquires the medium information and the content identification information attached to the medium information that are issued by the content information copying circuit, stores the acquired medium information and the content identification information attached to the medium information, wherein;

the encrypted content key distribution circuit receives a content viewing request from a user terminal device to which the copied information storage medium is set, receives medium information and content identification information written in the copied information storage medium from the user terminal device, compares the received medium information with the stored medium information issued by the content information copying circuit and, when the received medium information matches the stored medium information, sends the matched medium information with the received content identification information to the content key encryption circuit, acquires an encrypted content key from the content key encryption circuit, and distributes the encrypted content key from the content key encryption circuit to the user terminal device via a communication line, the content key encryption circuit receives the matched medium information and the content identification information from the encrypted content key distribution circuit, acquires content key identified by the content identification information, and encrypts, the acquired content key with the received medium information or the received medium information and device unique information of the user terminal device presented from the user terminal device to generate the encrypted content key, and the user terminal device reads out the access destination information from the copied information storage medium in accordance with the content viewing request, accesses, based on the access destination information, the encrypted content key distribution circuit via the communication line, presents the medium information and the content identification information stored in the copied information storage medium or the medium information, the content identification information, and the device unique information to the encrypted content key distribution circuit, acquires the encrypted content key from the encrypted content key distribution circuit, decrypts the encrypted content key with the medium information, and decrypts the encrypted content stored in the copied information storage medium with the decrypted content key.

2. A content information copying device of an information provision system, the system comprising:

a content encryption circuit which acquires content key generation conditions and content information from a copyright owner or a copyright manager of content, generates a content key on the basis of the content key generation conditions, and encrypts the content information using the content key to generate an encrypted content;

a content information copying circuit which attaches content identification information identifying the content information and access destination information to the encrypted content, writes the encrypted content to an information storage medium with the content identification information and the access destination information attached to the encrypted content to generate a copied information storage medium, the information storage medium comprising medium information including medium key information and a unique identifier of the information storage medium, acquires the medium information from the information storage medium, attaches the content identification information to the acquired medium information, and issues the medium information and the content identification information attached to the medium information;

a content key encryption circuit which stores the content key generated by the content encryption circuit; and an encrypted content key distribution circuit which acquires the medium information and the content identification information attached to the medium information that are issued by the content information copying circuit, stores the acquired medium information and the content identification information attached to the medium information, wherein:

the encrypted content key distribution circuit receives a content viewing request from a user terminal device to which the copied information storage medium is set, receives medium information and content identification information written in the copied information storage medium from the user terminal device, compares the received medium information with the stored medium information issued by the content information copying circuit and, when the received medium information matches the stored medium information, sends the matched medium information with the received content identification information to the content key encryption circuit, acquires an encrypted content key from the content key encryption circuit, and distributes the encrypted content key from the content key encryption circuit to the user terminal device via a communication line, the content key encryption circuit receives the matched medium information and the content identification information from the encrypted content key distribution circuit, acquires a content key identified by the content identification information, and encrypts the acquired content key with the received medium information or the received medium information and device unique information of the user terminal device presented from the user terminal device to generate the encrypted content key;

wherein the content information copying device comprises:

an encrypted content storage unit which stores the encrypted content generated from the content encryption circuit;

a copy processing unit which reads out encrypted content from the encrypted content storage unit and writes it into the information storage medium with the medium information written therein to create a copy of the encrypted content on the information storage medium; and a medium information issuing unit which transmits medium information of the information storage medium with the encrypted content copied thereon to the encrypted content key distribution circuit to store it therein;

wherein the user terminal device reads out access destination from the copied information storage medium in accordance with the content viewing request, and accesses, based on the access destination information, the encrypted content key distribution circuit.

3. A user terminal device which is used for an information provision system comprising:

a content encryption circuit which acquires content key generation conditions and content information from a copyright owner or a copyright manager of content, generates a content key on the basis of the content key generation conditions, and encrypts the content information using the content key to generate an encrypted content;

a content information copying circuit which attaches content identification information identifying the content information and access destination information to the encrypted content, writes the encrypted content to an information storage medium with the content identification information and the access destination information attached to the encrypted content to generate a copied information storage medium, the information storage medium comprising medium information including medium key information and a unique identifier of the information storage medium, acquires the medium information from the information storage medium, attaches the content identification information to the acquired medium information, and issues the medium information and the content identification information attached to the medium information;

a content key encryption circuit which stores the content key generated by the content encryption circuit; and an encrypted content key distribution circuit which acquires the medium information and the content identification information attached to the medium information issued by the content information copying circuit, stores the acquired medium information and the content identification information attached to the medium information, wherein:

the encrypted content key distribution circuit receives a content viewing request from the user terminal device to which the copied information storage medium is set, receives medium information and content identification information written in the copied information storage medium from the user terminal device, compares the received medium information with the stored medium information issued by the content information copying circuit and, when the received medium information matches the stored medium information, sends the matched medium information with the received content identification information to the content key encryption circuit, acquires an encrypted content key from the content key encryption circuit, and distributes the encrypted content key from the content key encryption circuit to the user terminal device via a communication line, the content key encryption circuit receives the matched medium information and the content identification information from the encrypted content key distribution circuit acquires a content key identified by the content identification information, and encrypts the acquired content key with the received medium information or the received medium information and device unique information of the user terminal device presented from the user terminal device to generate the encrypted content key;

wherein the user terminal device is configured to:
  access the encrypted content key distribution circuit via the communication line in viewing the copied information storage medium;
  acquire the encrypted content key distributed from the encrypted content key distribution circuit by presenting the medium information stored in the copied information storage medium, or present the medium information and the device unique information;
  decrypt the encrypted content key on the basis of the medium information stored in the copied information storage medium, or of the medium information and the device unique information; and reproduce the encrypted content recorded on the copied information storage medium by using the decrypted content key;

wherein the user terminal device reads out access destination information from the copied information storage medium in accordance with the content viewing request, and accesses, based on the access destination information, the encrypted content key distribution circuit.

4. A user management device of an information provision system, which is used for the information provision system allowing a user terminal device which enables reproducing content information from an information storage medium with the content information written therein together with at least medium information of a medium unique identifier and medium key information written therein, the system being composed of:

a content encryption circuit which acquires content key generation conditions and content information from a copyright owner or a copyright manager of content, generates a content key on the basis of the content key generation conditions, and encrypts the content information using the content key to generate an encrypted content;

a content information copying circuit which attaches content identification information identifying the content information and access destination information to the encrypted content, writes the encrypted content to an information storage medium with the content identification information and the access destination information attached to the encrypted content to generate a copied information storage medium, the information storage medium comprising medium information including medium key information and a unique identifier of the information storage medium, acquires the medium information from the information storage medium, attaches the content identification information to the acquired medium information, and issues the medium information and the content identification information attached to the medium information;

a content key encryption circuit which stores the content key generated by the content encryption circuit; and an encrypted content key distribution circuit which acquires the medium information and the content identification information attached to the medium information issued by the content information copying circuit, stores the acquired medium information and the content identification information attached to the medium information, wherein:

the encrypted content key distribution, circuit receives a content viewing request from user terminal device to which the copied information storage medium is set, receives medium information and content identification information written in the copied information storage medium from the user terminal device, compares the received medium information with the stored medium information issued by the content information copying circuit and, when the received medium information matches the stored medium information, sends the matched medium information with the received content identification information to the content key encryption circuit, acquires an encrypted content key from the content key encryption circuit, and distributes the encrypted content key from the key encryption circuit to the user terminal device via a communication line, the content key encryption circuit receives the matched medium information and the content identification information from the encrypted content key distribution circuit, acquires a content key identified by the content identification information, and encrypts the acquired content key with the received medium information or the received medium information and device unique information of the user terminal device presented from the user terminal device to generate the content key;

wherein the management device comprises a user information storage for storing user information of an encrypted content key distribution destination of the encrypted content key distribution circuit;

wherein the user terminal device reads out access destination information from the copied information storage medium in accordance with the content viewing request, and accesses, based on the access destination information, the encrypted content key distribution circuit.

5. The user management device of the information provision system according to claim 4, being further configured to: perform charging processing to the user terminal device in distributing the encrypted content key from the encrypted content key distribution circuit.

6. The user management device of the information provision system according to claim 5, wherein the corresponding encrypted content key is distributed to the encrypted content key distribution circuit after receiving a settlement by electronic money.

* * * * *